United States Patent [19]

Ishii

[11] Patent Number: 4,891,000
[45] Date of Patent: Jan. 2, 1990

[54] APPARATUS FOR BLOW MOULDING HOLLOW ARTICLE

[75] Inventor: Tatsushi Ishii, Fujisawa City, Japan

[73] Assignee: Nissan Motor Co., Ltd., Japan

[21] Appl. No.: 152,449

[22] Filed: Feb. 5, 1988

[30] Foreign Application Priority Data

Feb. 6, 1987 [JP] Japan .................................. 62-24701

[51] Int. Cl.⁴ ............................................. B29C 49/20
[52] U.S. Cl. ..................... 425/522; 220/1 B; 220/71; 220/85 F; 264/516; 264/540; 425/113; 425/503; 425/517; 425/525; 425/526; 425/532
[58] Field of Search ...................... 425/113, 114, 126.1, 425/461, 522, 525, 532, DIG. 33, 503, 517, 526; 264/516, 540, 541; 215/1 C; 249/206; 428/35, 36, 542.8, 36.9; 220/1 B, 71, 72, 85 F

[56] References Cited

U.S. PATENT DOCUMENTS 3,752,635  8/1973  Hinrichs ............................. 425/461
3,919,373  11/1975  Kormendi ........................ 264/516 X
4,396,562  8/1983  Heaume ......................... 264/516 X
4,719,072  1/1988  Kojima et al. .................. 425/525 X

FOREIGN PATENT DOCUMENTS 55-20157  2/1980  Japan .
  25380  2/1980  Japan ................................. 264/516
  79121  6/1980  Japan ................................. 264/516
  42936  3/1984  Japan ................................. 264/516
 125633  7/1985  Japan ................................. 264/516
1318384  5/1973  United Kingdom .

Primary Examiner—Richard L. Chiesa
Attorney, Agent, or Firm—Leydig, Voit & Mayer

[57] ABSTRACT

A preformed arrangement is suspended in a blow molding die by one or more suspension lines. A parison is formed about the arrangement and then pressed into contact with the same so that as the vessel is formed the arrangement and the suspension line or lines becomes connected and/or integral with the shell of the vessel.

3 Claims, 7 Drawing Sheets

APPARATUS FOR BLOW MOULDING HOLLOW ARTICLE

BACKGROUND OF THE INVENTION

1. Field of the Invention

The present invention relates to a technique of blow moulding a hollow article and more specifically to a technique of blow moulding a hollow article which has a structure formed integrally therewith.

2. Description of the Prior Art

FIGS. 1 and 2 show a moulding technique disclosed in JP-A-55-20157. This technique is used for producing plastic fuel tanks and the like type vessels wherein it is necessary to provide one or more baffles in order to increase the structural rigidity of the article and/or to prevent excessive and/or undesired movement of the fuel contained therein when (for example) a vehicle, in which the tank is disposed, is subject to an acceleration or change in attitude.

In this prior art technique a parison 1 of thermoplastic resin such as polyethylene, polypropylene, polycarbonate, vinyl chloride or ABS resin is extruded in a molten plastic state through an essentially annular orifice A defined between a core 2 and a die 4. The parison is, as shown in FIG. 2, pressed into shape using a two piece water cooled mould 6. One or both of the dies 8, 9 of the mould are formed with projections 10 (only one shown in FIG. 2) which form an inwardly projecting deformation 12. This deformation 12 acts as a baffle in the finished article.

However, this prior art technique has suffered from the drawback that, as the baffle is formed by deforming the parison in the above mentioned manner, the elongation ratio of the some portions of the parison are much higher than the elongation ratio for the rest of the same with the result that it is difficult to stably control the wall thickness of the final product. Further, as the indent is relatively thick it tends to undesirably reduce the internal volume of the product.

A further drawback comes in that the formation of the baffles using the above disclosed technique tends to wrinkle the external surface of the product and reduce the aesthetic value of the same.

Moreover, the prior art technique is limited to the formation of baffles and the like protrusions and does not lend itself to the construction of a vessel which houses and/or includes more complex arrangements including tubing, measuring instruments or the like.

SUMMARY OF THE INVENTION

It is an object of the present invention to provide a technique via which relatively complex structures can be formed integrally with, or secured within a hollow blow moulded article such as automotive fuel tanks and the like.

In brief, the above object is achieved by technique wherein a preformed structure is suspended in a blow moulding die by one or more suspension lines. A parison is formed about the structure and then pressed into contact with the same so that as the vessel is formed, the structure and/or the suspension line or lines becomes integral with the shell of the vessel.

More specifically, a first aspect of the present invention takes the form of a method of producing a hollow vessel comprising the steps of: suspending a structure in a predetermined location within a blow moulding arrangement; forming a parison about the suspended arrangement; pressing the parison into contact with the structure in a manner which shapes the parison into the shape of the vessel and which causes the parison and the structure to become attached in a manner wherein the structure becomes fixedly connected to the vessel.

A second aspect of the present invention takes the form of a blow moulding apparatus which features: means for forming a parison, said parison forming means including a die and a core; a mould, said mould including dies which can be closed together on said parison in a manner to form a hollow article; a structure; and means for suspending said structure within said parison so that when said mould is closed said structure and said parison are pressed into contact in a manner wherein the structure becomes fixedly connected with the portion of said parison which is shaped into said hollow article.

In the description of the invention, particularly as embodied in the drawings, reference to the conventional blowing means by which the parison is forced into the mould shape is omitted for the sake of clarity and simplicity.

DETAILED DESCRIPTION OF THE PREFERRED EMBODIMENTS

Figure 1:
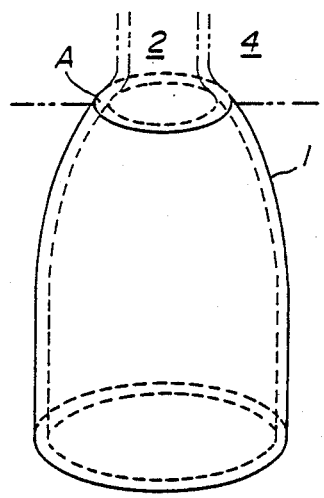
FIG. 1 shows a parison used in the prior art moulding technique discussed in the opening paragraphs of the instant disclosure.
Figure 2:
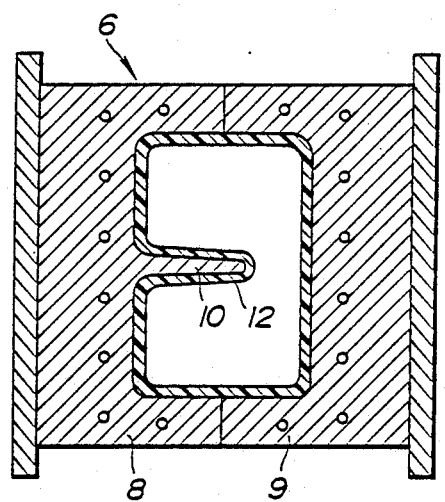
FIG. 2 is a cross-section of a mould used in the above mentioned prior art.
Figure 3:
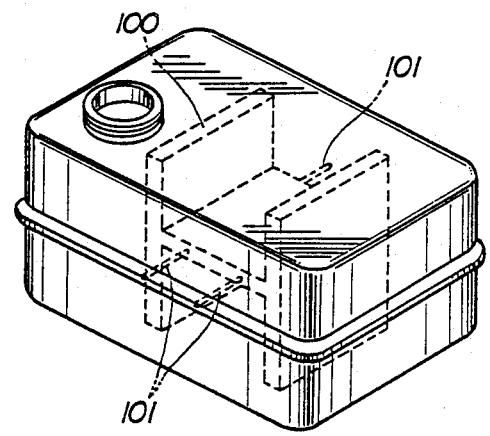
FIG. 3 is a perspective view of a fuel tank or similar hollow container produced using the technique according to the first embodiment of the present invention.
Figure 4:
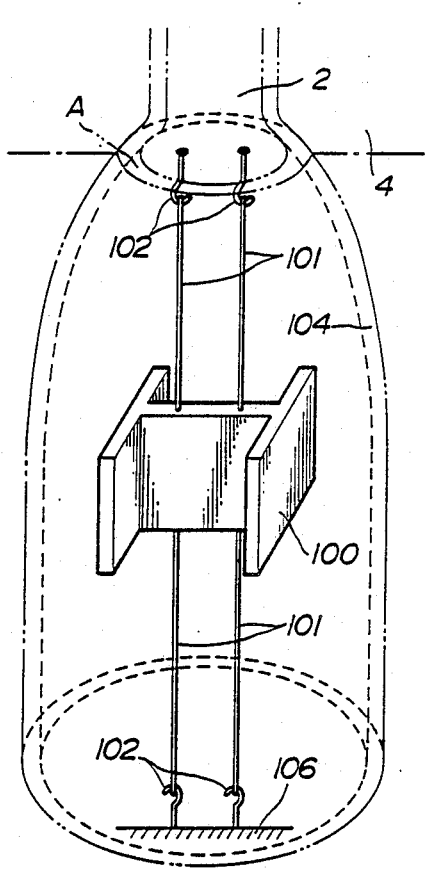
FIG. 4 is a perspective view showing a preformed baffle plate arrangement suspended within a parison ready for pressing in accordance with the first embodiment of the present invention.
Figure 5:
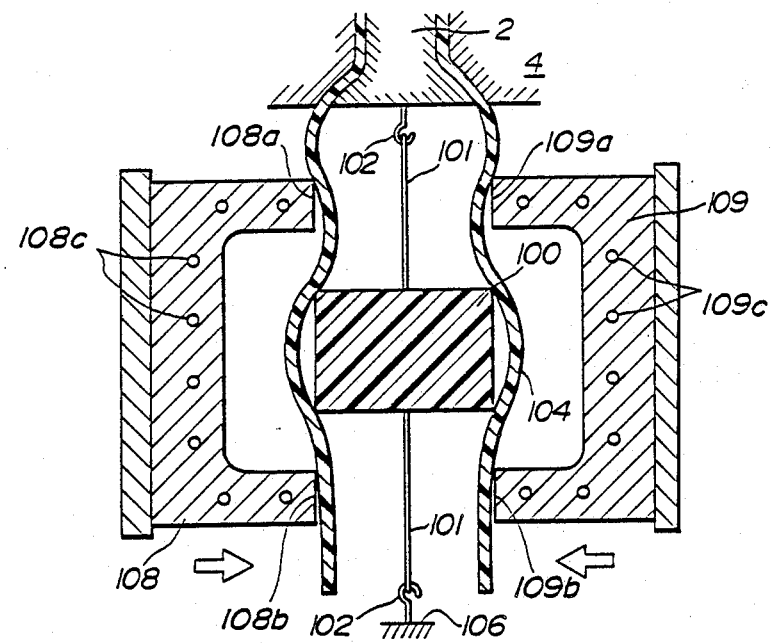
FIG. 5 is a sectional elevation showing the arrangement shown in FIG. 4 subject to the initial stage of the pressing.
Figure 6:
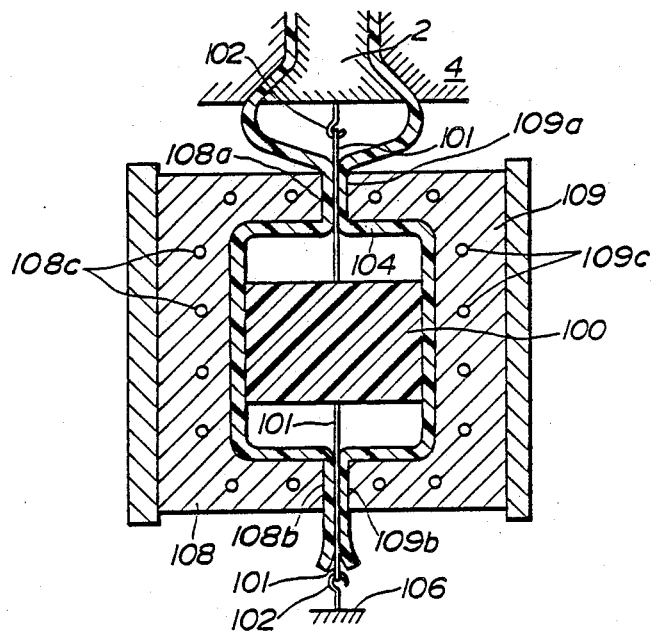
FIG. 6 is a sectional elevation similar to that of FIG. 5 but which shows the final stage of the pressing wherein the baffle arrangement and suspension lines become integral with the outer wall of the container.

FIGS. 4 to 6 show the operations and arrangements which characterize a first embodiment of the present invention. As shown, a preformed structure or arrangement 100 is suspended on lines 101 between hooks 102 provided on the floor 106 and the lower face of the core 2. In this arrangement the structure 100 takes the form of an essentially H-shaped baffle member. The lines or cables 101 via which the member is suspended in place, are either securely connected to or formed integrally with the structure.

A parison 104 is then formed about the suspended arrangement in the illustrated manner. Following this, the water cooled die blocks 108, 109 of the mould are closed together. This presses the parison 104 into the shape of a vessel in the manner illustrated in FIGS. 5 and 6. The recesses formed in the die blocks 108, 109 are arranged to press the parison 104 into contact with the baffle member in a manner wherein the contacting surfaces of the two bodies (ie. 100, 104) fuse and become integrally connected. The pinch sections 108a, 108b, 109a, 109b of the die blocks 108, 109 which form the seam which extends about the periphery of the vessel, are arranged to press or sandwich the suspension lines 101 in a manner that they fuse and become integral with the parison 104 (i.e. the wall of the vessel).

Following this, various other operations are performed in a manner to remove the extraneous portions. However, as such operations will be clearly apparent to those skilled in the art of blow moulding further description of the same will be omitted for brevity.

Figure 7:
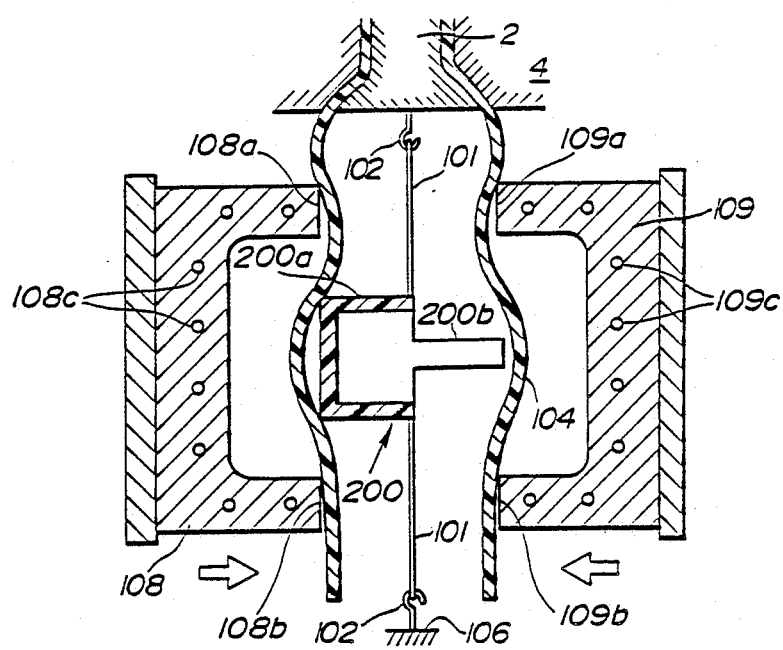
FIGS. 7 to 9 show the production of an automotive fuel tank in accordance with a second embodiment of the present invention.
Figure 8:
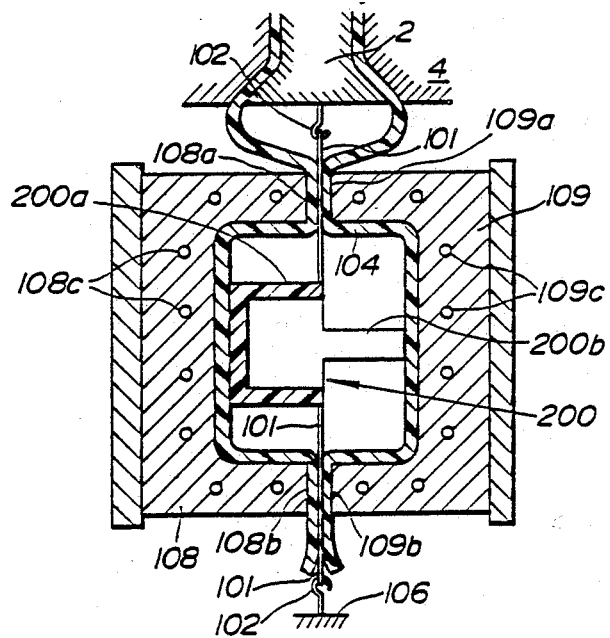
Figure 9:
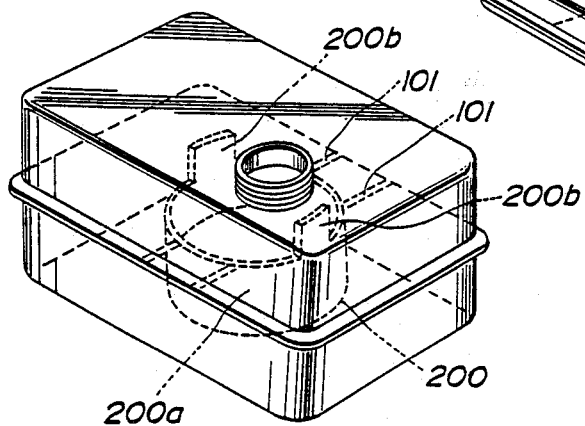

FIGS. 7 to 9 show a second embodiment of the present invention. In this embodiment the H-shaped baffle arrangement is replaced with a shallow bucket-like structure defining member 200 which is designed to ensure that a constant and uninterrupted supply of fuel can be tapped off from the fuel tank even when the vehicle in which the tank is mounted, is constantly driven along a curved path and centrifugal force is generated which tends to move the fuel to one side of tank.

This structure includes an essentially cylindrical main body portion 200a and two diametrically arranged ribs 200b which extend in the axial direction thereof.

When the mould is closed, such as shown in FIG. 8, the base of the main body 200a and the tops of the two ribs 200b are pressed into contact with the parison 104 in a manner wherein the contacting surfaces fuse and become integrally connected.

FIG. 9 shows the vessel which is produced in accordance with this second embodiment. As will be appreciated the member 200 is secured in essentially the middle of the vessel. The portions of the suspension lines 101 which remain in the vessel after production, while serving no particular purpose in this instance, present no problem and are left as they are.

Figure 10:
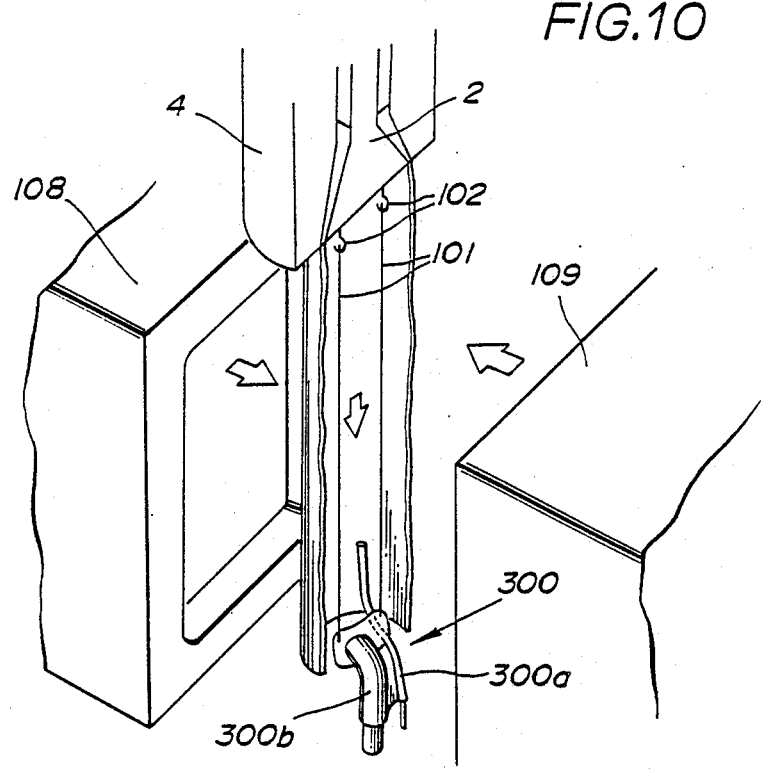
FIGS. 10 and 11 show the production of an automotive fuel tank or similar type container in accordance with a third embodiment of the present invention.
Figure 11:
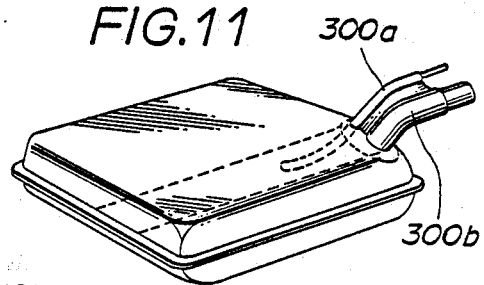

FIGS. 10 and 11 show a third embodiment of the present invention. According to this embodiment, a tube unit 300 consisting of a vent tube 300a and a filler neck 300b, is suspended in a relatively low position and the parison 104 extruded to the level shown in FIG. 9. When the dies 108, 109 of the mould are closed together the tube unit 300 becomes integrally connected with the parison 104 in a manner to form a portion of the outer wall of the vessel and to assume a configuration of the nature shown in FIG. 11.

Although this unit is shown suspended in a relatively low position in the die, it is alternatively possible to invert the unit and suspend it close the top of the same. Further, it can be suspended along with one or more structures which become enclosed within the vessel (by way of example), if so desired.

Figure 12:
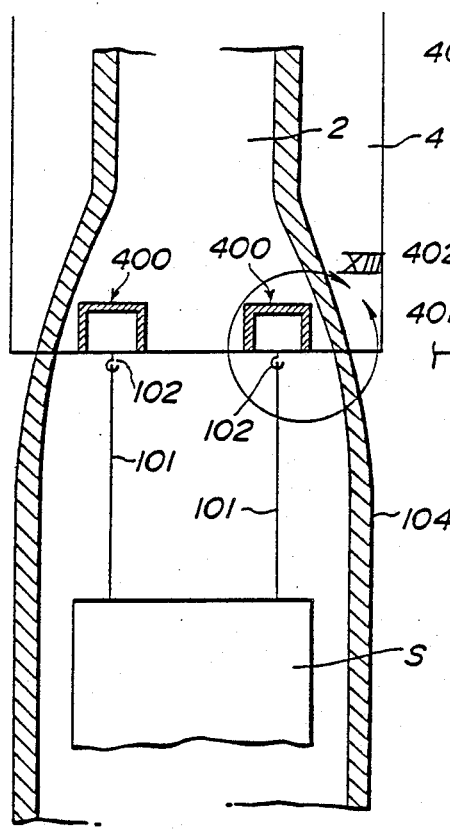
FIGS. 12 and 13 show details of a fourth embodiment of the invention wherein a cooling arrangement is used to prevent the hooks or the like to which the suspending lines are attached, from becoming heated to the point that the thermoplastic lines soften and break.
Figure 13:
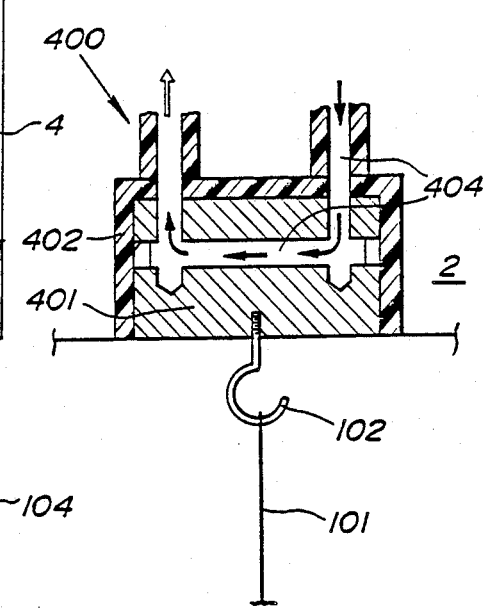

FIGS. 12 and 13 show a fourth embodiment of the invention.

As will be appreciated, the core 2 and the die 4 become heated to relatively high temperatures. As a result, the hooks 102 become heated and thus tend to melt the thermoplastic suspension lines 101 connected thereto. Accordingly, in the fourth embodiment, the hooks 102 which are used to support the suspension lines 101, are selectively insulated and cooled to prevent any thermally induced softening and undesired breakage.

In this instance the sections 401 of the core 2 to which the hooks 102 are connected, are each enclosed in a heat resistant thermally insulating jacket 402 and formed with intersecting bores 404 through which cooling water, such as flows through the cooling passages 108c and 109c of the die blocks 108 and 109, is induced to flow.

With this provision, the insulating jacket 402 prevents the conduction of a large amount of heat to the block enclosed therein while the water flow removes extraneous heat which is absorbed thereinto. This insulating/cooling arrangement lowers the temperature of the hooks 102 and obviates any undesired heating and softening of the suspension lines 101, and thus greatly reduces the chances of line breakage and improperly formed vessels being produced.

Figure 14:
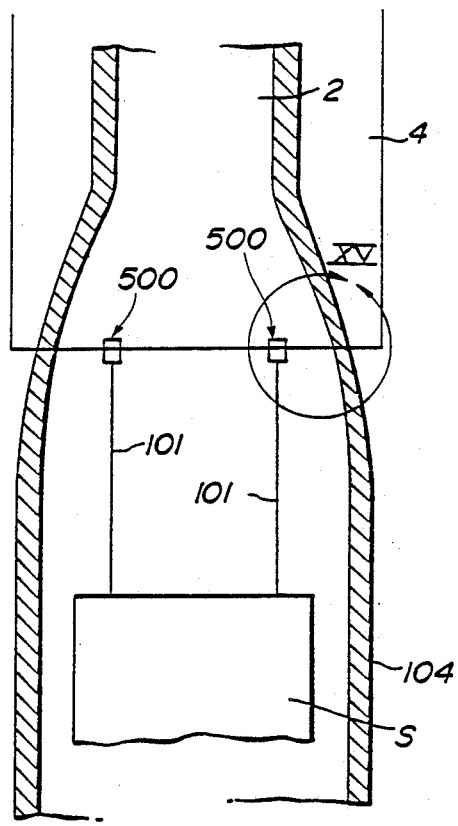
FIGS. 14 and 15 show the use of magnets and specially prepared connectors at the end of the suspending lines which characterize a fifth embodiment of the present invention.
Figure 15:
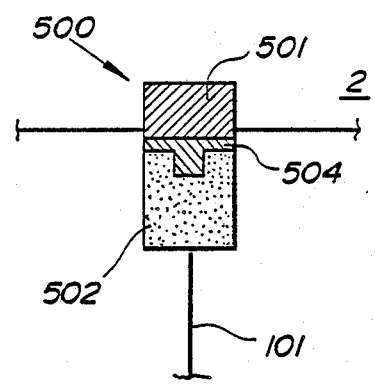

FIGS. 14 and 15 show an arrangement used in accordance with a fifth embodiment of the present invention. In this arrangement magnetic support arrangements 500 are used in place of the hooks 102.

In this arrangement magnets 501, which can be permanent or electromagnetic, are disposed in the lower face of the core 2. The ends of the suspension lines 101 are each formed with a connection piece 502 in which a ferromagnetic bracket 504 is fixed.

With this arrangement the structure S to be included in the vessel can be readily suspended in position and the dies of the mould closed. After each moulding the upper ends of the lines 101 can be removed and subject to recycling. Viz., the thermoplastic connection piece can be removed by melting and the bracket 504 and the molten plastic used to produce further structure units ready for suspension.

In order to protect the magnets 501 from thermal damage and to obviate any possibility of softening of the suspension lines 101, it is possible to dispose the same in insulated water cooled members of the nature shown in FIG. 13, if required.

Although only two techniques for protecting the suspension lines 101 from being softened by exposure to heat have been described, it will be understood that a number of other techniques exist and that the present invention is not limited to the same, said two having been given by way of example only.

It will be noted that in the disclosed embodiments of the present invention, while it is possible that the material from which the structure and the suspension lines 101 are formed is the same as that from which the parison 104 is formed, the present invention is not limited to this particular use and other suitable thermoplastic resins or the like type materials can be used to form the suspension lines and/or the structure, provided that an essentially integral and/or suitable finished product results.

It will also be noted that the present invention is not limited to the use of four suspension lines 101 (two above and two below) and that depending on the thickness of the same it is possible that two lines (one above and one below) be used. Alternatively, a single line can be used to hang (or support) the baffle arrangement in place if so desired. In this instance also, the various modifications which can be made to the suspension arrangement without departing from the scope of the present invention will be apparent to those skilled in the art to which the present invention pertains.

With the first embodiment for example, as the thickness of the baffle walls are not dependent on the thickness of the parison wall, they can be made as thin as required. This of course promotes an increase in the capacity of the vessel formed using the technique according to the present invention. Alternatively, thicker perforate baffling can be preformed and used in the instance an increase in structural strength and rigidity is required. In this instance the perforations can be designed to offset any loss in container capacity induced by the thickness of the baffles.

The complexity of the baffling is not limited to the relatively simple structure possible with the prior art and any number of perforated panels of complex shape can be preformed and suitably assembled (if necessary) prior the moulding operation.

Alternatively, it is possible to dispose a structure which re-enforces the vessel or which includes a level sensor mechanism or the like device, in lieu of and/or in addition to the baffling described hereinbefore. In fact a very large variety of structures can be integrated with the vessel using the technique which characterizes the present invention.

A metal structure can be included if provide with appropriate thermoplastic sections or suitably shaped portion which can engage the vessel walls, could be considered for inclusion in the vessel without departing from the scope of the instant invention. Merely by way of example, the portion of a metal structure which engage the walls of the vessel could be provided with small spikes, apertures or the like projections which can partially penetrate into the parison (or vice versa) as it is pressed thereagainst. Hence, the installation of a pump, level gauge or the like devices within the vessel, in addition to hose units and/or baffles etc., is within the scope of the present invention.

In order to reduce noise produced by the movement of liquid within a fuel tank or like vessel of the nature disclosed hereabove, it is within the scope of the present invention to enclose a body formed of metal or highly porous plastic foam either in place of, or in addition, to the above described structures.

A further merit of the present invention comes in that, as the structure is not formed by deforming the parison per se (a) unacceptable variations in the wall thickness of the vessel are obviated and (b) the external surface does not become wrinkled thus increasing the aesthetic value and marketability of the finished product.

What is claimed is:

1. In a blow moulding apparatus:
   means for forming a parison, said parison forming means including a die and a core;
   a mould, said mould including dies which can be closed together on said parison in a manner to form a hollow article;
   a structure; and
   means for suspending said structure within said parison so that, when said mould is closed, said structure and said parison are pressed into contact in a manner wherein the structure becomes fixedly connected to the portion of said parison which is shaped into said hollow article, said suspending means comprising:
   a first attachment device which is attached to the lower face of the core;
   a suspension line which is connected to said structure at one end and to said attachment means at the other, said suspension line being made of a thermoplastic material which can be fused and become integral with the parison when said mould is closed; and
   means for inhibiting heat being transferred from said core to said suspension line.

2. A blow moulding apparatus as claimed in claim 1 wherein said heat transfer inhibiting means comprises:
   a layer of solid thermally insulating material, said layer separating a portion of the core on which said attachment device is mounted from the remainder of said core, said layer inhibiting the transfer of heat to the portion of the core on which said attachment device is mounted from said remainder of said core; and
   passage structure formed in the portion of said core on which said attachment device is mounted, said passage structure being arranged to have a coolant passed therethrough.

3. A blow moulding apparatus as claimed in claim 1 wherein said suspending means comprises:
   a magnet, said magnet being disposed in the lower face of said core;
   a ferromagnetic bracket, said ferromagnetic bracket being arranged to be attracted to said magnet and to be held against the lower face of said core by said magnet; and
   a connection piece formed at one end of said first suspension line, said connection piece being attached to said ferromagnetic bracket, said connection piece being larger than said suspension line, said connection piece acting as said heat transfer inhibiting means.

* * * * *